June 12, 1956 L. B. JONES 2,749,780
PORTABLE DRILL PRESS

Filed Aug. 4, 1953 5 Sheets-Sheet 1

INVENTOR
LUTHER B. JONES
BY Fisher & Christen
ATTORNEY

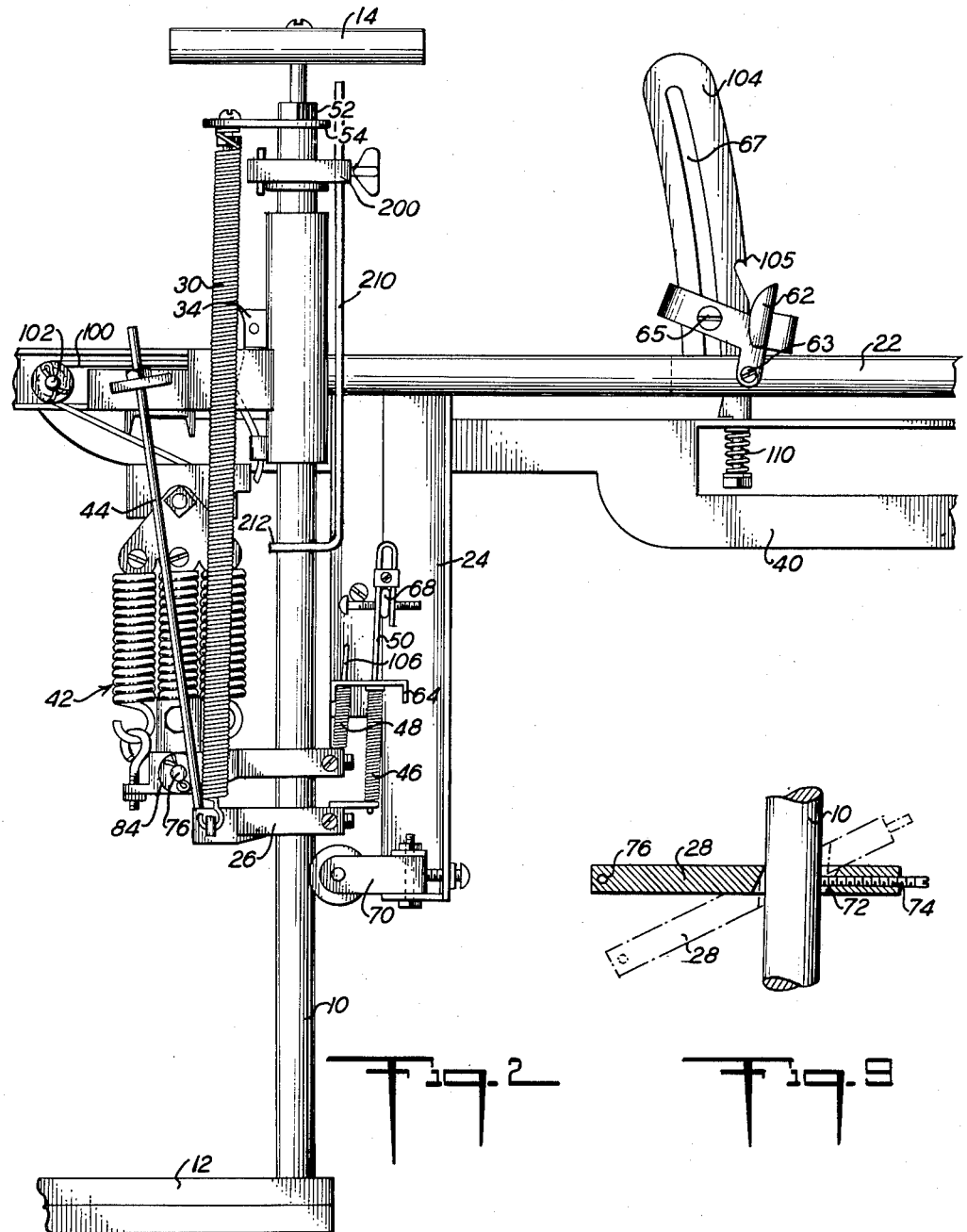

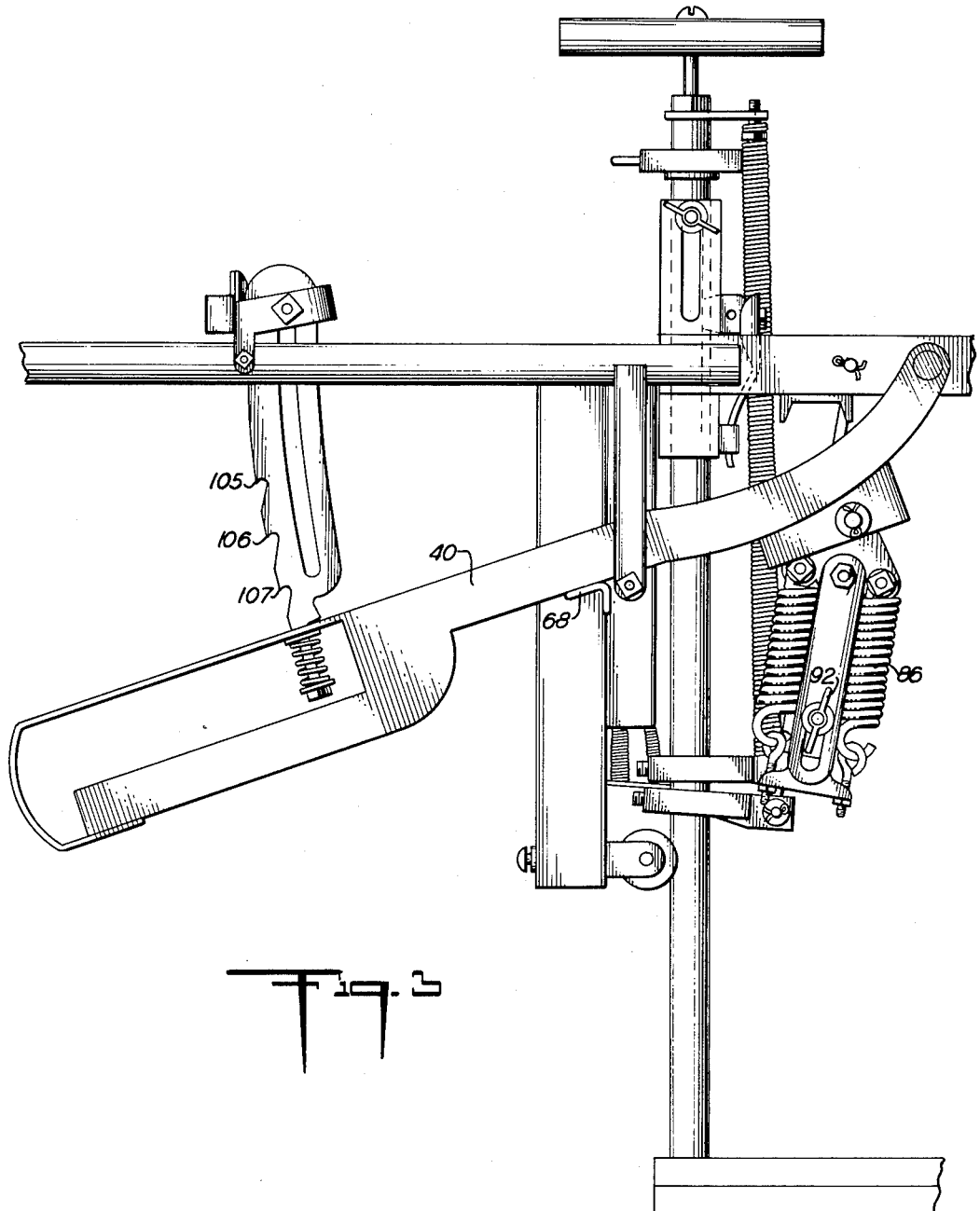

June 12, 1956 L. B. JONES 2,749,780
PORTABLE DRILL PRESS
Filed Aug. 4, 1953 5 Sheets-Sheet 4
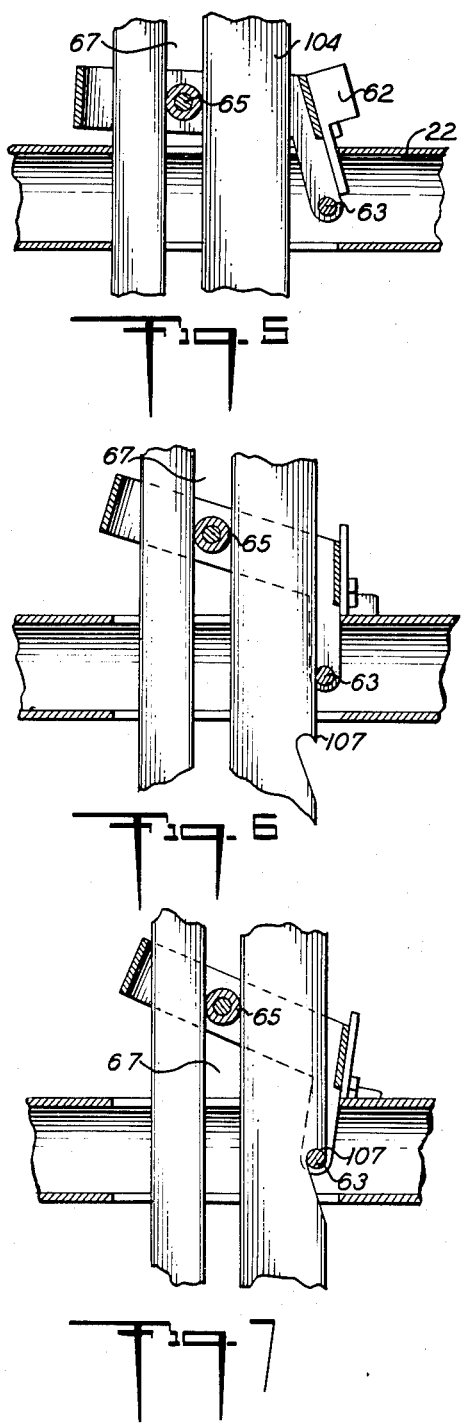
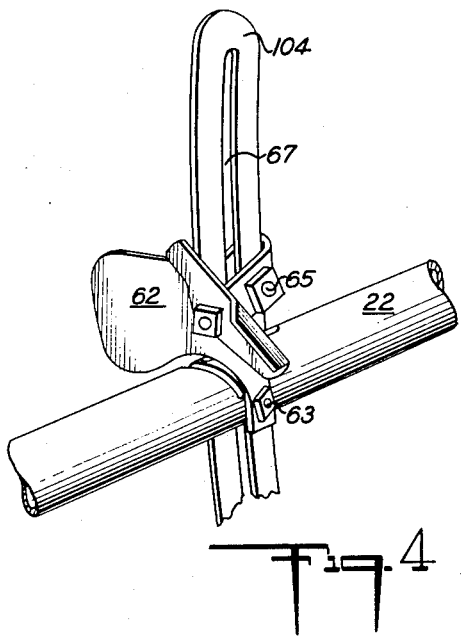
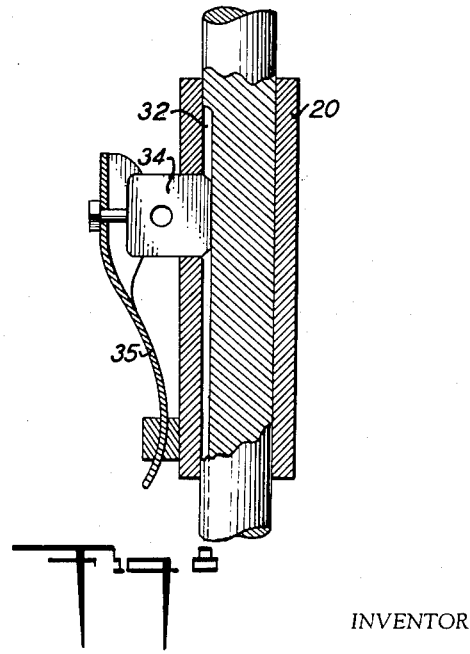
INVENTOR
LUTHER B. JONES
BY Fisher & Christen
ATTORNEY June 12, 1956

L. B. JONES 2,749,780

PORTABLE DRILL PRESS

Filed Aug. 4, 1953

INVENTOR
LUTHER B. JONES
BY Fisher & Christen
ATTORNEY

United States Patent Office 2,749,780
Patented June 12, 1956

2,749,780

PORTABLE DRILL PRESS

Luther B. Jones, Columbia, S. C.

Application August 4, 1953, Serial No. 372,254

10 Claims. (Cl. 77—7)

The present invention relates to a portable drill press which mounts a portable electric drill and the like and presses the drill into operative relationship with the work piece.

It is known to use devices of this general type for stabilizing portable drills operating on work pieces which are accessible to a standard stationary drill press. These devices find utility in working on stationary work pieces, such as overhead beams, vertical beams, and the like. The present invention is primarily concerned with an improved means for moving a portable drill into predetermined working relationship with a work piece.

One object of the invention is to provide a portable drill press having improved structure for lowering a drill to a predetermined position. Another object of the invention is the provision of means for automatically returning a lowered drill to the starting position. Still another object of the invention is the provision of means for predetermining the pressure to which a drill will be forced into engagement with the work piece. A further object of the invention is the provision of means for predetermining the depth to which a drill will automatically bore a hole in a work piece. Another object of the invention is the combination of the automatic depth and predetermined pressure control features with the automatic return feature. Other objects of the invention will be more readily apparent from a study of the detailed specification, the accompanying drawings and the appended claims.

The objects of this invention are accomplished by a stationary main supporting standard carrying a work engaging foot, a carriage slidably mounted on the standard, drill carrying on the carriage, a cooperating upper and lower rocker block mounted on the standard, and means connecting the rocker blocks with the carriage for tilting them in predetermined sequence to control carriage movement along the standard.

In the preferred form of the invention, a pivoted handle connects one end of the upper block with the carriage and a rigid member on the carriage connects the same end of the other block so that reciprocation of the pivoted handle alternately tilts the upper and the lower blocks for movement on the standard. To insure firm grip of the blocks on the standard, means are provided for spring biasing the otherwise unattached end of the blocks towards the position in which they are locked on the standard. The end of the blocks to which the handle and the rigid member are attached is referred to throughout this specification as the "raised lock" end of the blocks, because a slight upward movement of the end of the blocks towards the carriage tends to lock the blocks on the standard. For the same reason, the other end of the blocks is referred to as the "raised slide" end of the blocks.

A tension spring extending from the top of the standard to the lower portion of the carriage serves to counterbalance the carriage and to return the carriage to the top of the standard when the rocker blocks are both tilted to the sliding position. A second tension spring is interposed between the pivoted handle and the "raised lock" end of the upper rocker block, so that when the pivoted handle is pulled upwardly and the upper block locks itself on the standard, the extent of the carriage's tendency to move downward will be predetermined by the extent to which the springs are deformed. Thus, if, as in normal operation, downward movement of the carriage is resisted by the drill extending between the carriage and the work piece, there will be a predetermined pressure tending to force the drill bit into the work piece and that pressure will be a function of the strength of the spring between the carriage and the upper block.

The preferred form of the invention further includes latch means operatively connecting with the pivoted handle to make it possible to deform the spring a predetermined amount, which, in turn, predetermines the depth to which the bit will be forced into the work piece. A plurality of latch notches permits choosing a desired depth.

In those instances where manual pressure is preferred over spring pressure, the spring is removed from the linkage between the block and the handle.

Other features of this invention include the specific latch used in cooperation with the pivoted handle, releasable locking means for predetermining the angle of the work engaging foot with respect to the carriage about the axis of the standard and adjustability of the rocker blocks.

The structure of this invention is particularly adapted for use as a portable drill press, because of the simplicity of its operation and the low cost of its manufacture. In that form of the invention in which manual operating pressure alone is used, the device can be constructed extremely cheaply, yet there is no sacrifice of operating efficiency. In both forms of the invention, the automatic raising of the carriage affords a particularly desirable advantage. In that form of the invention where the spring is included between the pivoted handle and the upper rocker block, the double feature of predetermined pressure and predetermined depth is the gist of the improvement over other forms of the invention.

It is important in this invention that means be provided for lifting the raised slide end of the lower block at the end of the drilling operation to permit return of the carriage to the top of the standard.

The invention will be better understood by reference to the accompanying drawings in which:

Figure 2 is a side elevation taken from the opposite side of the device in the same position.

Figure 3 is a side elevation taken from the same side as Figure 1 but showing the pivoted operating handle in the releasing position when the carriage is ready to be raised to its uppermost position on the standard.

Figure 4 is a detail of the pivoted handle latch release.

Figures 5, 6, and 7 sequentially demonstrate operation of the latch release shown in Figure 4.

Figure 8 is a partial cross-section showing the detailed construction of the sliding key which holds the carriage in a relatively nonrotatable position with respect to the standard.

Figure 1:
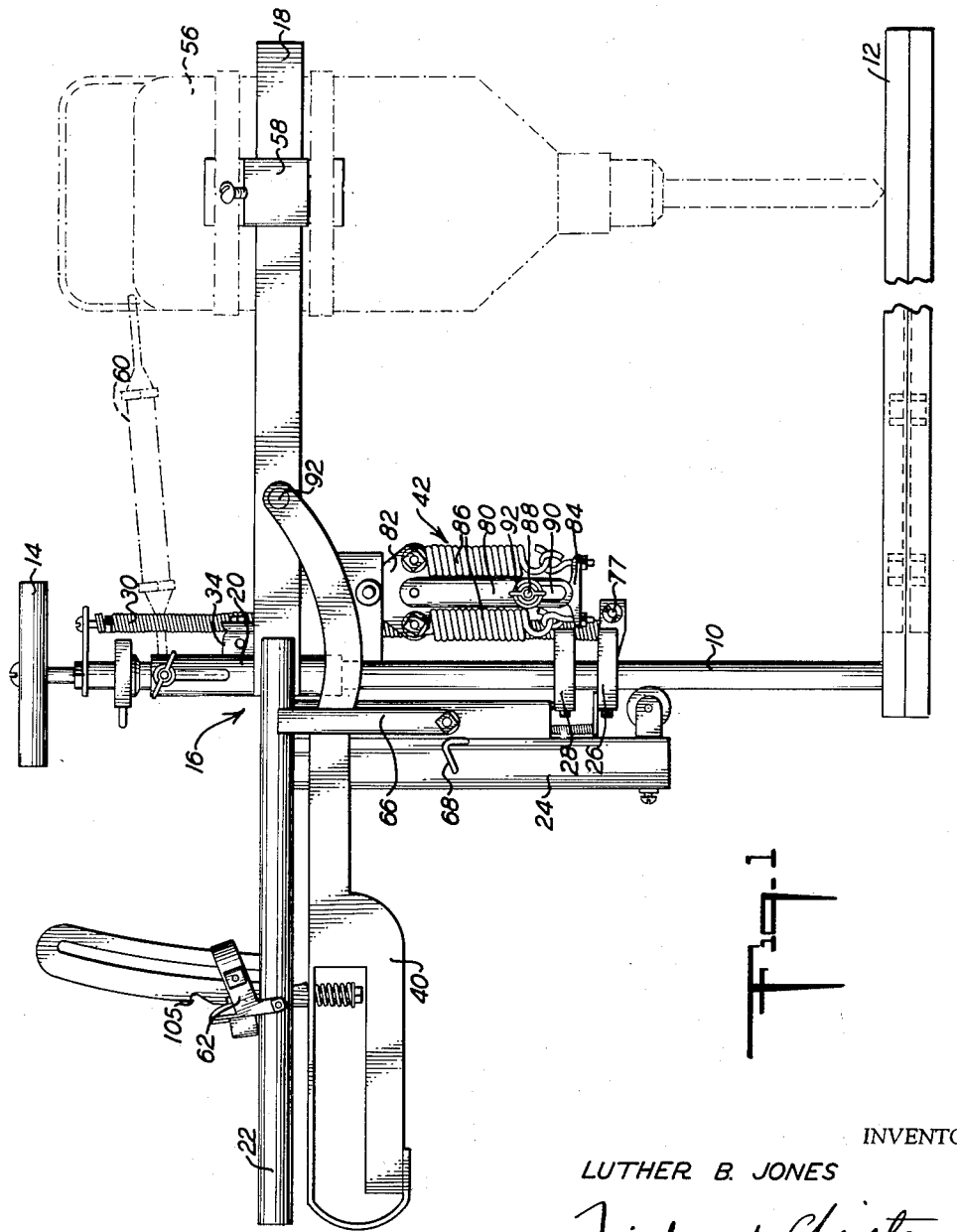
Figure 1 is a side elevation of a preferred form of the invention showing a drill positioned for use, as at the end of a drilling operation.

Figure 9 illustrates the detailed construction of the preferred rocker block used in the construction shown in Figures 1-3.

Figure 10:
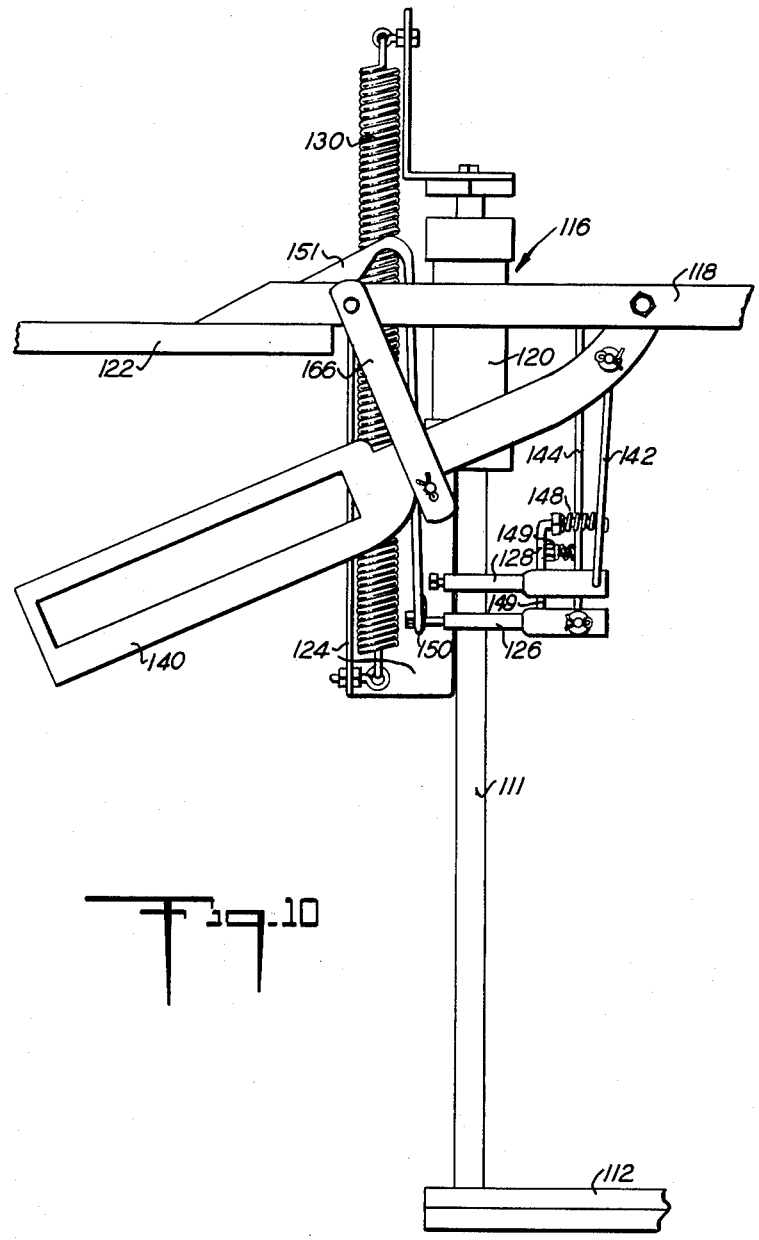

Figure 10 is a side elevation of a modification of the invention in which the spring connection between the pivoted handle and the upper rocker block is replaced by a relatively rigid member and no latch mechanism is associated with the pivoted handle.

*General description*

Referring now to that preferred form of the invention shown in Figures 1-9, a standard 10 carries a work engaging foot 12 at one end thereof and a handle 14 at the other end. Although the device may be operated with the standard turned in any direction, this specification is written with reference to the foot being positioned at the bottom of the standard and the handle being positioned at the top of the standard. A carriage indicated generally at 16 is slidably mounted on the standard and is adapted to be moved up and down thereon. The carriage includes a drill carrying arm 18, a sleeve 20 surrounding the standard 10, an arm 22, a member 44, and a depending bracket 24. A pair of apertured tiltable, gripping, rocker blocks 26 and 28 are positioned on the standard between the carriage and the foot. The rocker blocks and the carriage are connected by means hereinafter described in detail, which means operate to tilt or rock the blocks in predetermined sequence and lower the carriage. A tension spring 30 extends between the top of the standard and the bottom of the carriage for continually urging the entire carriage towards the top of the standard as shown in Figure 1. The spring is actually connected to the bottom of lower rocker block 26 but as can be seen in Figure 2, a compression member 44 extending directly from the carriage to the point of connection of the spring on the rocker block makes that point for all practical purposes a part of the carriage rather than a part of the means interconnecting the carriage with the rocker blocks. It will be obvious that spring 30 could be moved to extend between the top of the standard and the bottom of the depending bracket 24. A key way 32 and a sliding key 34 best shown in Figure 8, cooperate to prevent the carriage from rotating about the standard.

The means for connecting the rocker blocks and the carriage include a pivoted operating handle 40, a spring link assembly 42 extending between the pivoted handle and the raised locked end of the upper rocker block and a pivotal connection between the relatively rigid carriage member 44 and the raised lock end of the lower rocker block 26. Referring to Figure 2, it will be seen that a pair of springs 46 and 48 are positioned to bias the raised slide end of the rocker blocks 26 and 28, respectively, downwardly towards a locking position. It will also be seen that a release latch 50 extends from the raised slide end of rocker block 26 to a point where it can be lifted for releasing the carriage when it has reached the bottom of the standard.

Standard

The standard 10 is an ordinary steel shaft provided with a longitudinal slot 32 extending a sufficient distance to permit the desired up and down motion of the carriage. The work-engaging foot 12 may take any desired form depending on the nature of the work piece and the position of the work piece. In one form of the invention the foot is secured to the standard by welding. In another form of the invention the foot can be moved to any desired position by the provision of set screw connections. In still another form of the invention the foot is formed as a clamp for grasping and holding an overhead beam. Other modifications will be obvious to those skilled in the art.

In one form of the invention the handle 14 is affixed to the other end of the standard by welding. In the preferred form of the invention, the handle is screw-threaded into the end of the standard 10 by means not shown and the threaded portion of the handle screw carries a nut 52 which clamps a spring-carrying lug 54 into position for supporting the tension spring 30.

Carriage

The carriage can take any of several forms. The preferred form in Figures 1, 2 and 3 includes the drill-carrying arm 18 perpendicular to the standard 10 and the sleeve 20, and which is formed from a U-shaped angle iron. A drill indicated at 56 by the dotted lines, carries a set screw positioned clamp 58 for mounting the drill on the arm 18. A supporting bracket 60 extends from the drill handle to the top of the carriage to assure that the drill will always be parallel to the standard. The sleeve 20 is of conventional design and can be the length shown or it can extend downwardly just short of the top block 28. The arm 22 is really a rearward extension of the drill carrying arm and it cooperates with the pivoted handle 40 for lowering the drill. The arm 22 carries a latch 62 which will be described in more detail in connection with the operation of the device. The depending members 24 and 44 are considered a part of the carriage as they are for all practical purposes integral therewith. Member 44 performs a definitely critical carriage function, whereas, the function of member 24 could be changed radically without departing from the scope of the invention.

As shown in Figures 1, 2 and 3, member 24 carries a bracket 64 for biasing springs 46 and 48 downwardly against the upper side of the raised slide end of block 26 and 28 respectively. Member 24 also carries a guide 66 for the pivoted handle and carries a pivoted trip finger 68 which extends laterally through it for tripping release latch 50. Member 24, at its bottom, mounts a guide roller 70 for steadying the movement of the carriage on the standard. As is best shown in Figure 8, the carriage mounts a sliding key 34 by means of a leaf spring 35. The latch extends through an opening in the sleeve 20 and into the normally vertical slot 32 extending longitudinally of the standard to prevent rotation of the sleeve about the standard. However, if rotation is desired, one can manually pull the key out of the slot by thumb pressure against spring 35.

Blocks

The term "rocker block" is used to describe a rigid block provided with a hole that is adapted to surround the standard both for easy sliding movement thereon when held in one predetermined plane and for locking itself against sliding movement when tilted to a different plane. Each end of the preferred rocker blocks of this invention is attached to the carriage. Raising one first end of either rocker block slightly will lock that block against sliding movement, particularly if the other end is simultaneously lowered. By the same token, raising the opposite end of either block will promote sliding. Thus the former end of these blocks is called the "raised lock" end and the opposite end is called the "raised slide" end.

Referring now to Figure 9, block 28 is shown in cross-section both in a full line and a dotted line position to illustrate its detailed structure. Block 26 has the same structure as that shown in Figure 9. In the full line position it will be noted that the block is generally perpendicular to the standard. This is the locked position of that block. A hole 72 in the block is slanted so that the upper edge of the raised lock end of the block digs into the standard while leaving a substantial clearance at the bottom of that end of the block. In the same position, the raised slide end of the block is almost in engagement with the standard at its bottom but is provided with a substantial clearance at its top. A set screw 74 extends horizontally and longitudinally through the lower portion of the raised slide end of the block. It is positioned adjacent the bottom of the block so that it may extend into the opening 72 for engagement with the standard when the block is locked thereon. It will be seen that as the block wears, the set screw can be tightened to assure a firm lock throughout the life of the apparatus. In the dotted line position shown in Figure 9, the block is tilted with its raised slide end raised and its raised lock end lowered. In this position it will be seen that the hole 72 has its walls generally parallel to the walls of the standard for ease of sliding movement thereon. It will be noted that a pivot 76 is provided well away from the standard at the raised lock end of this block.

It is, of course, obvious that in other modifications of the invention, the set screw 24 can be eliminated by carefully machining the hole 72 to close tolerances with respect to the standard 10. Likewise, the walls of hole 72 can be at right angles to the block although a firmer lock appears to be obtainable in the form shown.

*Connecting Means*

The raised lock end of the upper rocker block is pivotally connected to the pivoted handle 40 through a spring link assembly 42. The spring link assembly comprises a slotted variable length link 80, a pair of end supports 82 and 84 and a plurality of tension springs 86 extending between the end supports 82 and 84. The end support 84 is provided with a threaded lug 88 which extends through a slot 90 in the link 80. A thumb screw 92 is fitted on the lug where it may be left loose to make the link of variable length or may be tightened so that the linkage operates completely independent of the springs. The end member 84 is pivotally connected to block 28 at pivot 76. The operating handle 40 is pivoted at pivot 92 on the carriage so that it is adapted to reciprocate within the limits of guide 66.

A torsion spring 100 positioned on post 102 has one end fixed extending longitudinally along the drill carrying arm 18 and the other end positioned on the handle 40 so that it is continually urging the handle to the release position shown in Figure 3.

A rack 104 is mounted on the handle 40 to extend through the arm 22 for cooperation with the latch 62. The latch is pivoted about a pin 63 and carries a guide pin 65. A slot 67 in the rack receives and is guided by the guide pin. The rack 104 is provided with a series of notches 105, 106 and 107 for engagement with the pivot pin 63 for a purpose to be described hereinafter. The rack 104 is mounted on the handle by a spring biased post 110 which continually urges the rack in the direction of the latch pivot 63.

The raised slide end of the upper rocker block is only connected with the carriage to the extent that a pivoted guide post 106 extends from its pivotal mounting on the block upward through an aperture in bracket 64. The guide post serves the sole function of guiding spring 48 as it is constantly urging the raised slide end of the rocker block 28 downwardly. It will be obvious that if other means are provided for urging the raised slide end of the block downwardly, no connection would be needed between the raised slide end of the upper block and the carriage.

The raised lock end of the lower block is pivotally mounted on the carriage at pivot point 77 as member 44 is considered a part of the carriage for the purpose of this invention.

The raised slide end of block 26 is connected to the carriage only to the extent that latch 50 is pivotably attached thereto and extends through bracket 64 to serve as a guide post for spring 46 which continually urges the raised slide end of block 26 downwardly. Latch 50 also serves the purpose of positively lifting the raised slide end of both blocks 26 and 28 when it is desired to release the carriage for return to the top of the standard.

*Operation*

In operation, a work piece, not shown, is mounted on the foot 12 by any desired means. As shown in Figure 1, the foot itself may be viewed as a work piece. A drill 56, provided with a clamp 58, is fastened on the drill carrying arm 18 as shown in Figure 1. The turnbuckle 60 is affixed to the drill handle at one end and the standard at the other and is tightened to firmly fix the drill so that its bit will be parallel to the standard. The exact positioning required for each drill can be easily ascertained by an ordinary workman. The operating handle is then released from the position shown in Figure 1 by pressing latch 62 forwardly with a light thumb pressure. Spring 100 forces the handle to the position shown in Figure 3 where it engages trip finger 68 (Fig. 3) and pivots it to raise latch 50. In so doing, the raised slide end of block 26 will be raised to the point that it engages the raised slide end of block 28 and both are made fully slidable on standard 10. In this position, the blocks, the carriage and the connecting means are all easily slidable on the standard and the tension spring 30 will normally urge them to the top of the standard. The drill is then lowered by downward pressure on arm 22 until the end of its bit is in engagement with the work piece.

If it is desired to use manual pressure alone for the drilling operation, thumb screw 92 should be tightened to effectively remove springs 86 from the linkage between the handle and the upper rocker block. In such event, the latch 62 and rack 104 are unnecessary and with the thumb latch 62 continually pressed into its foremost position, the handle 40 is moved upwardly towards arm 22. Upward movement of the handle raises the raised lock end of block 28 through spring link assembly 42 to lock that block and the rest of the carriage along with the other block and the drill is moved downwardly. It may be that the desired hole can be drilled by one upward movement of the handle. If not, reciprocation of the handle will move the drill deeper into the work piece. If the handle is partially lowered, as in reciprocation, the raised lock end of upper block 28 is lowered so greatly that that block is moved to a sliding position as shown in the dotted lines of Fig. 9. At the same time, the lower block 26 is subject only to the pressure of spring 46. That spring forces it into a locked position so that while the carriage remains stationary with respect to block 26, block 28 is lowered to a new position closely adjacent block 26. When movement of the operating handle is reversed and it is again raised, block 28 is locked and block 26 is released. The cycle may be thus repeated until the desired depth has ben reached. Return of the drill and the carriage to the top of the standard can be accomplished by permitting the operating handle to fall all the way to the bottom of guide 66 so that it engages trip finger 68 for positively lifting the raised slide end of both rocker blocks.

If it is desired to use spring pressure for drilling rather than manual pressure, the thumb screw 92 may be loosened. In such event, the operation is identical with that just described except that when the drill engages the work piece, upward movement of the handle 40 towards the carriage does not move the drill downwardly. The operating handle can be pulled all the way to the top without moving the carriage downwardly. In so doing, spring 86 will be deformed to the full extent. When so deformed, lug 88 will be at the bottom of the slot in link 8 and the springs 86 will then be tending to urge the carriage downwardly. If the drill is started with the bit in engagement with the work and the springs 86 thus deformed, the drill will be urged into the work piece by the spring pressure only. This is a highly desirable feature as it prevents the over zealous workman from forcing the drill into the work piece so strongly as to break bits or burn out the drill motor. Three springs 87 are used to obtain a uniform degree of force, regardless of the length of distortion.

If one desires to set the drill for drilling to a predetermined depth, the drill is first positioned with its bit in engagement with the work piece. This can be done by the carriage manipulation described above. Notches 105, 106 and 107 on handle rack 104 shown best in Figure 3, each represent the depth to which a hole will be drilled if the handle is raised to position them on pivot 63. Now, if the handle is raised to notch 107 and latched as shown in Figure 7, the springs 86 will then be distorted 3/8 of an inch. The drill may then be started and it will automatically bore a hole 3/8 of an inch deep, the depth having been predetermined by the amount of spring distortion which, in turn, was predetermined by the position in which the rack held the handle. The raised handle can be latched in the notch 105 also. In such instance, because there is only ⅛ inch deformation of springs, the hole will be bored to only ⅛ inch depth likewise, notch 106 represents a depth of ¼ inch.

Thus, it will be seen that by varying the notches in the rack 104 and the springs 86 in the spring assembly 42, holes of any desired depth can be automatically bored in a predetermined sequence.

In this connection, in Fig. 2, a set screw controlled vertically adjustable upper stop block 200 is provided on the standard above the carriage to limit the upward carriage movement as desired, thus to reduce the work of an operator drilling a plurality of shallow holes. Block 200 is provided with a set screw closable hole in which is mounted a vertically adjustable stop rod 210 which carries at its bottom a stop for halting downward movement of the carriage at a predetermined exact level. This can be used to doubly assure accuracy of the depth to which a hole is bored.

Where only manual lowering of the drill into the work piece is desired, that form of the invention shown in Figure 10 is preferred. There, a standard 111 carries a foot 112 at one end. A carriage indicated generally at 116 is slidably mounted on the standard for movement up and down thereon. The carriage includes a drill-carrying arm 118 at one end, a slidable sleeve 120 mounted on the standard, an arm 122 and a depending support member 144.

A large tension spring 130 extends between the top of the standard and the bottom of the carriage for raising the carriage to its uppermost position on the standard. The raised slide ends of the rocker blocks are not connected to the carriage but a lifting latch 150 is provided for lifting the raised slide end of the rocker blocks when the carriage is to be released for up or down motion on the standard. A thumb actuated linkage lifts latch 150. Each rocker block is provided with a spring means 148, tending to press it into the locked position. A pivoted operating handle 140 reciprocates within a guide 166 to tilt the upper rocker block by means of a straight link 142 which is pivotally mounted on the raised lock end of the upper rocker block. A compression link 124 connects the raised lock end of the lower rocker block with the carriage. It will be obvious that the operation of this modification of the invention is generally the same as the operation of the other form of the invention when thumb screw 92 is tightened and thumb latch 62 is held in a forward position, the primary difference being that release of the rocker blocks for raising the carriage is accomplished by linkage 150 and 151 which is independent of the operating handle.

I claim as my invention:

1. A portable drill comprising a standard carrying a work-engaging foot, a carriage slidably mounted on said standard, a drill carrying member on said carriage, a pair of rocker blocks mounted on said standard between the foot and the carriage, each rocker block having a raised block end and a raised slide end, an operating lever pivotally connected to said carriage and having a handle at one end thereof and a link pivotally connected at one end to said operating lever and at the other end to the raised lock end of said upper rocker block, the raised lock end of said lower rocker block being pivotally attached to said carriage whereby reciprocation of said operating handle effects movement of said carriage along said standard in the direction of said foot.

2. A portable drill press as set forth in claim 1 which includes in addition, spring means for biasing the raised slide end of each said blocks downwardly.

3. A portable drill press as set forth in claim 2, wherein said link has limited extensibility and a tension spring biases the link to its shortest length whereby movement of said handle in a direction tending to pull the carriage towards the rocker blocks will be exerted through said spring to the extent of the extensibility of said link.

4. A portable drill press as set forth in claim 3 wherein means are provided for locking said lever in one or more predetermined positions, whereby said tension spring automatically applies pressure predetermined by the size of the spring for a distance predetermined by the extent of deformation of the spring.

5. A portable drill press as set forth in claim 3 wherein manually operable means are provided for removing the effect of said tension spring at predetermined intervals.

6. A portable drill press as set forth in claim 2 wherein a second tension spring connects the top of the standard with the lower portion of the carriage for opposing lowering motion of said blocks and returning the carriage to the upper part of the standard.

7. A portable drill press as set forth in claim 2 wherein means are provided for lifting the raised slide end of the lower block to permit return of the mount to the top of the post.

8. In a drill press wherein a drill is lowered by a mechanism responsive to movement of a reciprocating lever, that improvement which comprises a link between said lever and said mechanism, said link having limited extensibility, and a spring biasing said link to one limit of its extensibility, the direction of the spring biasing force being such that movement of the lever in the feeding direction will cause the feeding force to be exerted through said spring to the extent of the extensibility of said link.

9. An improved drill press as set forth in claim 8, wherein the spring is a tension spring normally biasing said link to its shortest length and the feeding movement of said lever tensions said link.

10. An improved drill press as set forth in claim 8 which includes in addition, means for holding said lever in a position which deforms said spring a predetermined amount, whereby a hole of predetermined depth may be drilled automatically.

References Cited in the file of this patent

UNITED STATES PATENTS

| | | |
|---|---|---|
| 975,031 | Greene | Nov. 8, 1910 |
| 1,141,859 | Bader et al. | June 1, 1915 |
| 2,629,267 | Hart | Feb. 24, 1953 |